(12) United States Patent
Kanda et al.

(10) Patent No.: US 7,700,058 B2
(45) Date of Patent: *Apr. 20, 2010

(54) PROCESS FOR DENITRATION OF EXHAUST GAS

(75) Inventors: Nobuyasu Kanda, Tokyo (JP); Kimihiko Sugiura, Tokyo (JP); Shoichi Ibaragi, Ichihara (JP); Youichi Takahashi, Ichihara (JP); Yutaka Tsukui, Ichihara (JP)

(73) Assignee: Mitsui Engineering & Shipbuilding Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/087,363

(22) PCT Filed: Dec. 28, 2006

(86) PCT No.: PCT/JP2006/326234

§ 371 (c)(1),
(2), (4) Date: Jul. 2, 2008

(87) PCT Pub. No.: WO2007/077921

PCT Pub. Date: Jul. 12, 2007

(65) Prior Publication Data

US 2009/0053122 A1   Feb. 26, 2009

(30) Foreign Application Priority Data

Jan. 6, 2006   (JP)   .............................. 2006-001815

(51) Int. Cl.
  *B01D 53/56*   (2006.01)
  *B01D 53/94*   (2006.01)

(52) U.S. Cl. .................... 423/235; 423/212; 423/213.2; 423/239.1; 423/413

(58) Field of Classification Search .............. 423/239.1, 423/235, 212, 213.2, 239.5, 413; 422/172; 95/129

See application file for complete search history.

(56) References Cited

U.S. PATENT DOCUMENTS

| 6,247,303 | B1 * | 6/2001 | Broer et al. ................... 60/274 |
| 6,682,709 | B2 * | 1/2004 | Sudduth et al. ............. 423/235 |
| 2005/0069477 | A1 * | 3/2005 | Hong et al. .............. 423/239.1 |
| 2009/0004082 | A1 * | 1/2009 | Takahashi et al. ......... 423/239.1 |

FOREIGN PATENT DOCUMENTS

| JP | 2004-188388 A | 7/2004 |
| JP | 2005-002968 A | 1/2005 |
| JP | 2005-254093 A | 9/2005 |

* cited by examiner

*Primary Examiner*—Wayne Langel
*Assistant Examiner*—Syed Iqbal
(74) *Attorney, Agent, or Firm*—Kubovcik & Kubovcik

(57) ABSTRACT

A denitration process for removing nitrogen oxides contained in low-temperature exhaust gas at a high denitration rate; namely, a denitration process for reductively removing nitrogen oxides contained in an exhaust gas (x) containing nitrogen monoxide and sulfur dioxide. The process comprises a preliminary step 2 of partially oxidizing nitrogen monoxide in the exhaust gas to form nitrogen dioxide, a radical formation step 3 of adding a nitrogen compound and a hydrocarbon compound to a high-temperature zone 22 to form amine radicals (r), and a denitration step 4 of mixing the amine radicals (r) with the pretreated gas (p) containing nitrogen monoxide and nitrogen dioxide that was discharged from the preliminary step 2. As a result, nitrogen oxides in the exhaust gas (x) are reductively decomposed.

9 Claims, 5 Drawing Sheets

PROCESS FOR DENITRATION OF EXHAUST GAS

This application is a 371 of international application PCT/JP2006/326234 filed Dec. 28, 2006, which claims priority based on Japanese patent application No. 2006-001815 filed Jan. 6, 2006, which is incorporated herein by reference.

TECHNICAL FIELD

The present invention relates to a process for the denitration of exhaust gas, and more specifically, to a process for the denitration of exhaust gas wherein nitrogen oxides are reductively removed from exhaust gas exhausted from an engine such as a diesel engine for a ship or power generator.

BACKGROUND ART

In recent years, much attention has been focused on the reduction of particulate matter and nitrogen oxides exhausted from automotive diesel engines such as those on buses and trucks. Similarly, the removal of harmful substances contained in the exhaust gas of engines such as diesel engines for ships and power generators, boiler exhaust gas, and plant off-gas is an important problem. However, while automotive diesel engines use diesel fuel oil for fuel, which has a low sulfur content, diesel engines such as those on ships and power generators use high sulfur content fuel known as Class A or Class C fuel oils (JIS standard). For this reason, the exhaust gas of the latter contains a large amount of sulfur oxides, and processing the gas to remove harmful substances is a significant obstacle.

Typically, non-catalytic denitration and selective catalytic reduction (SCR) are known as denitration processes for exhaust gas. Non-catalytic denitration is widely known as a denitration process using a nitrogen-based reducing agent such as ammonia or urea, but unless the exhaust gas is in a high-temperature state (900° C. to 1000° C.), high-activity catalysis cannot be obtained (for example, see the patent literature 1 and 2). For this reason, given the relatively low-temperature (approx. 250° C. to 450° C.) exhaust gas exhausted from diesel engines such as those on ships and power generators, it is necessary to pre-treat the exhaust gas to heat it and raise the temperature thereof, which in turn leads to increased treatment costs and makes the application of non-catalytic denitration problematic.

In addition, while non-catalytic denitration using ammonia achieves a high denitration rate at the laboratory level, it has been difficult to obtain a denitration rate exceeding 50% in an actual furnace such as a boiler. For example, the non-patent literature 1 shows a denitration process wherein, for a temperature range of 900° C. to 1050° C., the supplied quantity of ammonia is divided into a pre- and a post-stage, and these ammonia quantities are respectively controlled and supplied according to the boiler load. However, the denitration rate of this process is only approximately 40% under equimolar conditions of nitrogen oxides and ammonia. Furthermore, if ammonia is excessively supplied in order to raise the denitration rate, unreacted ammonia remains and treatment costs increase. Moreover, in the case where the exhaust gas contains sulfur oxides, ammonium sulfate is created, so that the treatment thereof leads to worsened cost-effectiveness.

In contrast, the patent literature 3 proposes as an SCR process a method in which nitrogen monoxide in the exhaust gas is oxidized to nitrogen dioxide; subsequently, in the presence of an SCR catalyst, a reducing agent of ammonia, urea, a hydrocarbon, or the like is added; and the nitrogen dioxide is catalytically reduced. However, this SCR process is inferior to the non-catalytic denitration process in that it uses a large quantity of SCR catalyst. Furthermore, there is the problem that when the exhaust gas temperature is 300° C. or less, sulfur dioxide in the exhaust gas that has oxidized to sulfur trioxide and the like reacts with the ammonia to create ammonium hydrogen sulfate, which poisons the SCR catalyst and reduces catalytic activity. For this reason, the SCR process is only applied when exhaust gas is in a high-temperature state of 300° C. or greater whereby the ammonium hydrogen sulfate decomposes, or when the concentration of sulfur oxides in the exhaust gas is approx. 1 ppm or less.

In such circumstances, the patent literature 4 proposes a method in which a heating zone is formed in a flue or in a chamber communicated with the flue, the flue carrying a low-temperature exhaust gas containing sulfur oxides; subsequently, nitrogen compounds and hydrocarbons are blown toward this heating zone to form amine radicals; and these amine radicals denitrate the nitrogen oxides in the exhaust gas. However, the denitration rate in this denitration process is not entirely sufficient, and there is demand to further raise the denitration rate.

Patent Literature 1: U.S. Pat. No. 6,066,303
Patent Literature 2: Japanese patent application Kokai publication No. 2002-136837
Patent Literature 3: Japanese patent application Tokuhyo publication No. 2001-525902
Patent Literature 4: Japanese patent application Kokai publication No. 2005-254093
Non-patent Literature 1: "Fuel Conversion and SOX/NOX Countermeasure Technologies: A Focus on Exhaust Desulfurization/Denitration", by Junpei Ando (Project News, Jun. 25, 1983, p. 205-207)

DISCLOSURE OF THE INVENTION

Problem to be Solved by the Invention

It is an object of the present invention to provide a denitration process that removes nitrogen oxides from low-temperature exhaust gas at a high denitration rate.

Means to Solve the Problem

The denitration process of the present invention that achieves the above object reductively removes nitrogen oxides in exhaust gas that contains nitrogen monoxide and sulfur dioxide. The process comprises: a preliminary step of oxidizing a portion of the nitrogen monoxide in the exhaust gas to nitrogen dioxide; a radical formation step of adding a nitrogen compound and a hydrocarbon compound to a high-temperature zone to form amine radicals; and a denitration step of mixing the amine radicals with the pretreated gas containing nitrogen monoxide and nitrogen dioxide discharged from the preliminary step.

At this point in the process, it is preferable to add a further step of mixing amine radicals into the treated gas discharged from the denitration step, and it is further preferable to perform this step two or more times.

In addition, the high-temperature zone is preferably formed in the vicinity of a burner flame or an electric heater, the temperature of this high-temperature zone preferably being 600° C. to 1000° C. It is preferable to form the high-temperature zone in the interior of the exhaust gas flue.

In addition, it is preferable that the preliminary step oxidize nitrogen monoxide to nitrogen dioxide by subjecting the exhaust gas to contact treatment with an oxidation catalyst or plasma exposure treatment. The oxidation catalyst herein is a catalyst supporting an active metal on a titanium-containing carrier, wherein the active metal is preferably at least one selected from the group consisting of vanadium compounds, niobium compounds, molybdenum compounds, and tungsten compounds.

In addition, in the preliminary step it is preferable that the ratio Sc/Nc of the sulfur dioxide oxidation rate Sc to the nitrogen monoxide oxidation rate Nc be 0.01 to 0.2.

ADVANTAGES OF THE INVENTION

As a result of the denitration process of the present invention, a portion of the nitrogen monoxide in exhaust gas is oxidized to form nitrogen dioxide, thereby raising the reactivity of the nitrogen oxides. For this reason, reductive decomposition of nitrogen oxides in the denitration step is made easier. Moreover, adding a nitrogen compound and a hydrocarbon compound to the high-temperature zone in the radical formation step allows for efficient formation of amine radicals due to the reactions between the hydroxy radicals formed from the hydrocarbon compound and the nitrogen compound. The amount of residual, unreacted nitrogen compound at this point is also low. Furthermore, by mixing these amine radicals with the pretreated gas containing nitrogen monoxide and nitrogen dioxide discharged from the preliminary step, nitrogen oxides can be efficiently decomposed by reduction in the denitration step. Consequently, even when the exhaust gas temperature is low, a high denitration rate can be achieved because the mutual reactivity of nitrogen oxides and amine radicals is high. Furthermore, since a reduction catalyst is not used, substances such as ammonium sulfate are not formed and the denitration efficiency is not lowered, even if the exhaust gas contains sulfur oxides.

In addition, since residual nitrogen oxides in the treated gas are reductively decomposed by further subjecting the treated gas discharged from the above denitration step to amine radicals, the ultimate denitration rate can be significantly raised. Since the reactivity of the amine radicals is also high in this case, it is possible to efficiently conduct treatment for the removal of nitrogen oxides, even when the temperatures of the exhaust gas and the treated gas are low, and even when the concentration of nitrogen oxides is low.

BEST MODES FOR CARRYING OUT THE INVENTION

Hereinafter, the configuration of the invention will be described in detail with reference to the accompanying drawings.

Figure 1:
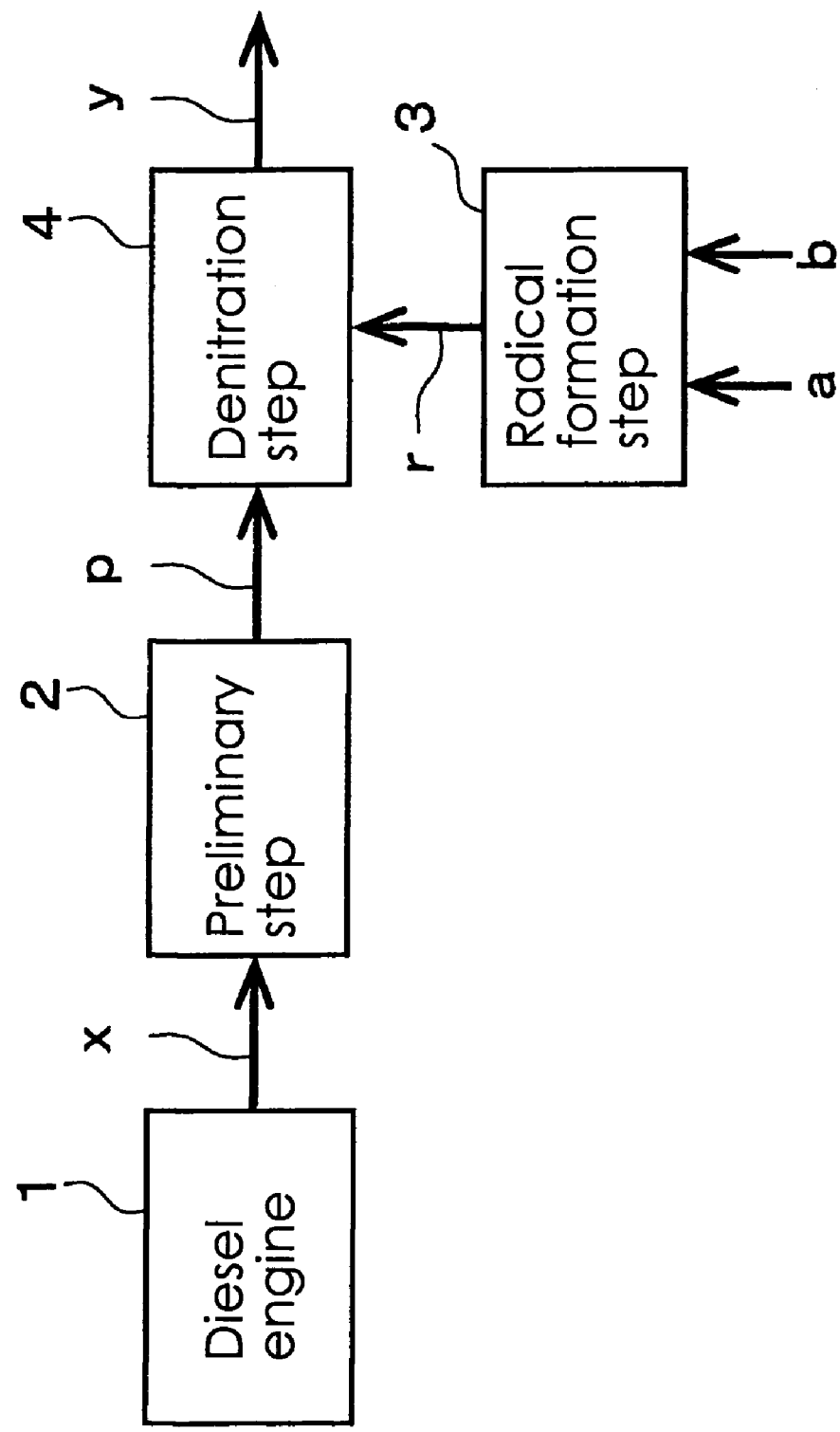
FIG. 1 is block flowchart showing an exemplary process in the exhaust gas denitration process of the present invention.

In FIG. 1, an exhaust gas (x) exhausted from a diesel engine 1 contains nitrogen monoxide and sulfur dioxide. In the preliminary step 2, a portion of the nitrogen monoxide in this exhaust gas (x) is oxidized to nitrogen dioxide, and the exhaust gas x is then sent to the denitration step 4 as pretreated gas (p). Meanwhile, in the radical formation step 3, a nitrogen compound (a) and a hydrocarbon compound (b) are added to a high-temperature zone to form amine radicals (r), and these amine radicals (r) are sent to the denitration step 4. In the denitration step 4, the amine radicals (r) act on the nitrogen monoxide and the nitrogen dioxide contained in the pretreated gas (p), and thereby these nitrogen oxides are reductively decomposed. The treated gas (y) is the exhaust gas from the denitration step 4 that has been denitrated to remove the nitrogen oxides therein.

Figure 2:
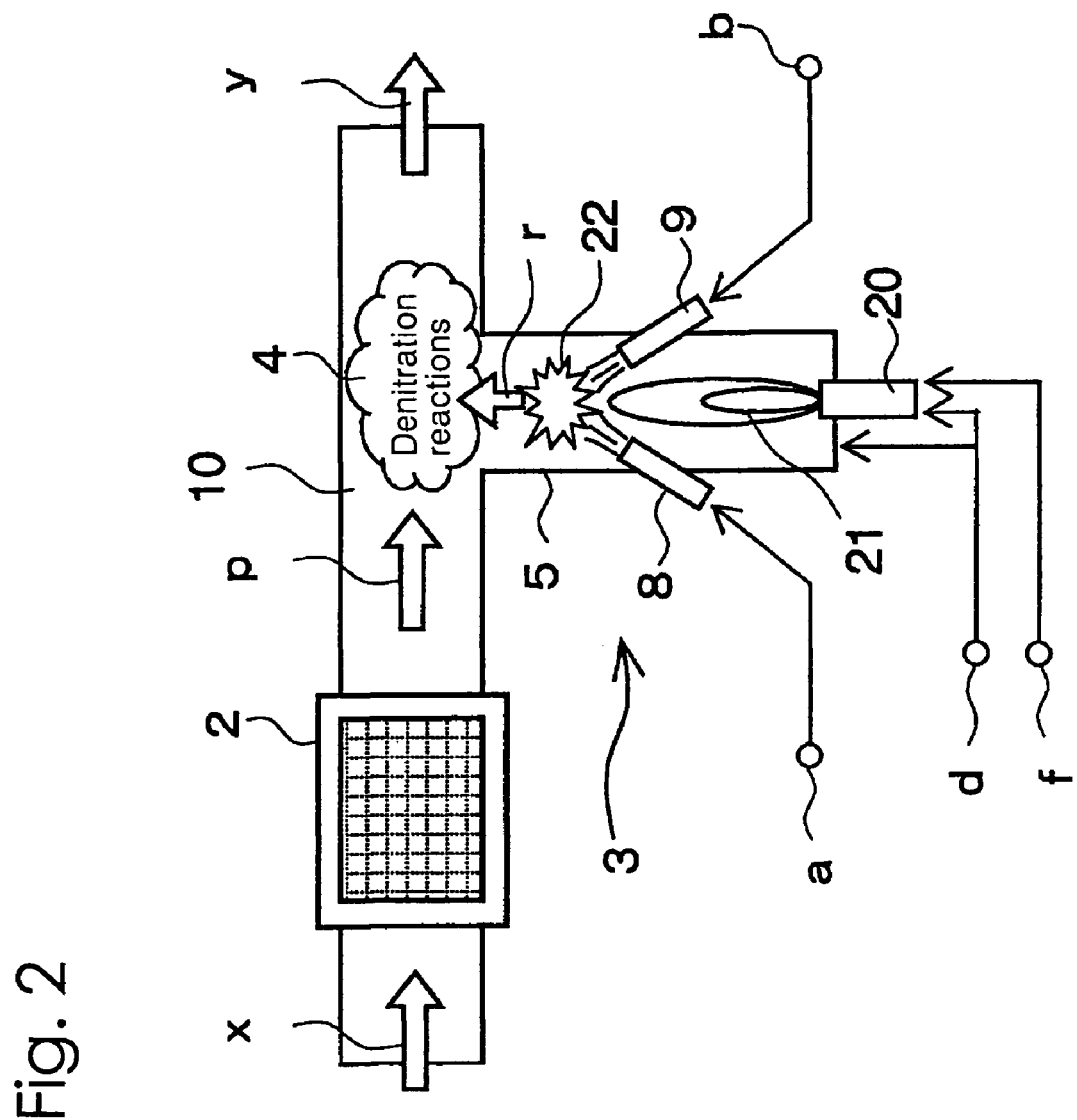
FIG. 2 is an explanatory diagram showing an exemplary equipment configuration used in the exhaust gas denitration process of the present invention.

As shown in FIG. 2, the radical formation step 3 herein is provided with a burner 20 at the end of a pipe portion 5, the pipe portion 5 being connected at an approximate right angle to the flue 10 of the exhaust gas (x). A high-temperature zone 22 is formed at the tip of the flame 21 of this burner 20. When the nitrogen compound (a) and the hydrocarbon compound (b) are respectively added in the direction of the high-temperature zone 22 from nozzles 8 and 9, the amine radicals (r) (a reducing gas) is formed. These amine radicals (r) are supplied to the denitration step 4 and act on the nitrogen oxides in the pretreated gas (p) to decompose them by reduction. It should be appreciated that while the high-temperature zone is formed by the flame of a burner in the example in FIG. 2, the high-temperature zone is not limited thereby, and may also be formed in the vicinity of an electric heater or a heat exchanger.

In the present invention, the preliminary step 2 is the step wherein a portion of the nitrogen monoxide in the exhaust gas (x) is oxidized to form nitrogen dioxide. Since the pretreated gas (p) discharged from the preliminary step 2 contains nitrogen dioxide, the reactivity of the entire nitrogen oxides increases, and therefore reductive decomposition in the denitration step 4 becomes easier.

In the preliminary step, it is not necessary to oxidize all of the nitrogen monoxide in the exhaust gas, so long as at least one portion thereof is oxidized to nitrogen dioxide. The ratio of nitrogen dioxide to nitrogen oxide in the pretreated gas is preferably 40 wt % or greater, and more preferably 50 wt % or greater. By bringing the proportion of nitrogen dioxide to within the above ranges, the reactivity of the nitrogen oxides in the pretreated gas increases, and nitrogen oxides can be more easily decomposed by reduction in the denitration step.

The method oxidizing the nitrogen monoxide is not particularly limited, and may include the method of contacting with an oxidation catalyst, a plasma exposure method, or the ozone oxidation method. Among these, the method of contacting with an oxidation catalyst and the plasma exposure method are preferable, since nitrogen monoxide only can be selectively oxidized without oxidizing sulfur dioxide in the exhaust gas (x). Typically, when conducting oxidation treatment on exhaust gas exhausted from diesel engines such as those on ships or power generators, negative effects more readily occur, such as not only nitrogen monoxide but also sulfur dioxide being oxidized and becoming particulate matter and thus becoming more difficult to remove, or reacting with ammonia to form ammonium sulfate during the denitration reactions. However, since contact treatment with an oxidation catalyst and plasma exposure treatment selectively oxidize nitrogen monoxide to nitrogen dioxide but hardly oxidize sulfur dioxide, and the above negative effects can be prevented.

In the preliminary step herein, the ratio Sc/Nc of the sulfur dioxide oxidation rate Sc to the nitrogen monoxide oxidation rate Nc is preferably 0.01 to 0.2, more preferably 0.01 to 0.1, and even more preferably, 0.01 to 0.05 (herein taking Nc as the nitrogen monoxide oxidation rate and Sc as the sulfur dioxide oxidation rate). By bringing the ratio of oxidation rates Sc/Nc to within such ranges, the reactivity of nitrogen oxides can be raised by selectively focusing on the oxidation of nitrogen monoxide to nitrogen dioxide, while at the same time suppressing the negative effects accompanying the oxidation of sulfur dioxide to sulfur trioxide and similar substances.

The oxidation treatment used in the present invention has a nitrogen monoxide oxidation rate Nc that is preferably 30% or greater, more preferably 40% or greater, and even more preferably 50% or greater. By bringing the oxidation rate Nc to within the above ranges, nitrogen dioxide can be formed more effectively. In addition, the sulfur dioxide oxidation rate Sc is preferably 5% or less, more preferably 2% or less, and even more preferably 1% or less. By bringing the oxidation rate Sc to within the above ranges, the formation of substances such as sulfur trioxide can be effectively suppressed. In the present invention, the nitrogen monoxide oxidation rate Nc and the sulfur dioxide oxidation rate Sc are calculated by measuring the respective concentrations of nitrogen oxides and sulfur oxides in the exhaust gas (x) before the preliminary step and the pretreated gas (p) after the preliminary step.

The plasma exposure treatment is not particularly limited so long as it selectively oxidizes nitrogen monoxide, but an atmospheric low-temperature plasma exposure treatment is preferable. Specifically, microwave discharge, alternating-current discharge (e.g., pulse discharge), or direct-current discharge (e.g., spark discharge or arc discharge) may be used.

It is preferable that the plasma-generating electrode of the atmospheric low-temperature plasma exposure means be capable of generating plasma via an atmospheric pulse discharge, whereby plasma is suitably generated and exhaust gas is exposed thereto while in a flowing state, and then nitrogen monoxide is efficiently oxidized. Electrodes having a coaxial structure with a conducting core of stainless steel, steel, Kanthal, or Inconel, for example, may be used as such a plasma-generating electrode. These plasma-generating electrodes are able to oxidize nitrogen monoxide to nitrogen dioxide at low energies.

On the other hand, contact treatment using an oxidation catalyst oxidizes nitrogen monoxide to nitrogen dioxide by passing the exhaust gas through a catalyst layer containing an oxidation catalyst. The catalyst layer substrate is not particularly limited so long as it is able to support an oxidation catalyst and contact the exhaust gas; for example, a stainless steel metal honeycomb filter, a ceramic honeycomb filter, a wire mesh filter, a ceramic barrier filter, or similar filter may be used. Among these, a stainless steel metal honeycomb filter is preferable.

The oxidation catalyst is not particularly limited so long as it selectively oxidizes nitrogen monoxide, but it is preferable to be a catalyst supporting an active metal on a titanium-containing carrier. The active metal may be at least one selected from the group consisting of vanadium compounds, niobium compounds, molybdenum compounds, and tungsten compounds. In particular, vanadium compounds and tungsten compounds are preferable. Such oxidation catalysts perform the function of selectively oxidizing nitrogen monoxide to nitrogen dioxide while suppressing the oxidation of sulfur dioxide to sulfur trioxide or other substances. Moreover, these oxidation catalysts have a low incidence of poisoning of the active metal by sulfur trioxide or similar substances in the exhaust gas, and also make it possible to maintain the nitrogen monoxide selective oxidation functions over a long period of time.

For the active metal, vanadium oxide, vanadyl sulfate, vanadyl nitrate, vanadium chloride are preferable examples of vanadium compounds; niobium oxide, niobium sulfate, and niobium chloride are preferable examples of niobium compounds; molybdenum oxide, molybdenum sulfate, and molybdenum chloride are preferable examples of molybdenum compounds; and tungsten oxide, tungsten sulfate, and tungsten chloride are preferable examples of tungsten compounds. Among these, vanadium oxide, tungsten oxide, molybdenum oxide, and niobium oxide are further preferable. These active metals may be used singly or in a combination of two or more of the above active metals.

In particular, even more pronounced advantages can be obtained by jointly using a vanadium compound and a tungsten compound as the active metal, and thus such a combination is preferable. Specifically, vanadium oxide and tungsten oxide, vanadium oxide and molybdenum oxide, or vanadium oxide and niobium oxide may be preferably used. When using vanadium oxide and tungsten oxide in particular as the active metal, the sulfur dioxide oxidation rate can be suppressed while raising the nitrogen monoxide oxidation rate.

The nitrogen monoxide oxidation rate for these oxidation catalysts is low when compared to the oxidation rate for the typical oxidation catalyst, i.e., a platinum catalyst. However, the low oxidation rate can be compensated by increasing the amount of active metal used. In other words, it is possible to acquire these active metals cheaply compared to a platinum catalyst, and by increasing the usage amount thereof the quantity of nitrogen dioxide formed can be made equivalent to that of the platinum catalyst.

The carrier supporting the active metal is not particularly limited, but carriers of $TiO_2$, $Al_2O_3$, $SiO_2$, $ZrO_2$, zeolite, or similar material are preferable. Herein, $SiO_2$ is silicon oxide excluding quartz, and includes compounds such as silica and zeolite ($Al_2O_3$—$SiO_2$). In addition, the carrier may also be a blend made by combining two or more of any of $TiO_2$, $Al_2O_3$, $SiO_2$, and $ZrO_2$, for example the combinations $TiO_2$ and $SiO_2$, or $Al_2O_3$ and $SiO_2$. For the support that coats the catalyst carrier, typical catalyst supports excluding the carrier composition, such as a metal support substrate, cordierite, or a carbon-based composite, may be used. The composition of the support is not particularly limited, and in addition the combination of the elements constituting the catalyst carrier is not limited. It is preferable for the active metal to be supported on a titanium-containing carrier, i.e., $TiO_2$. By using $TiO_2$ for the carrier, the sulfur dioxide oxidation rate can be suppressed while maintaining the nitrogen monoxide oxidation rate.

Consequently, the use of an oxidation catalyst consisting of vanadium oxide and tungsten oxide supported on $TiO_2$, or alternatively, a catalyst consisting of vanadium oxide supported on $TiO_2$ as the oxidation catalyst used in the treatment process of the present invention is most preferable for achieving the object of the invention.

These active metals may be of any configuration from among the following: powdered, granulated, honeycomb, coated on a wire filter, coated on a ceramic paper roll, coated on filter fabric, or dip-coated on a honeycomb carrier. In addition, the active metal may be prepared using publicly known methods or appropriately selected from among commercially available products. In addition, the carrier constituting the oxidation catalyst may be prepared using publicly known methods or appropriately selected from among commercially available products. Consequently, the oxidation catalyst obtained by supporting an active metal on a carrier may be prepared using publicly known methods or appropriately selected from among commercially available products.

In the present invention, the radical formation step 3 is the step wherein a reducing gas is formed independently, i.e., the step wherein a nitrogen compound and a hydrocarbon compound are added to the high-temperature zone to form amine radicals of a reducing gas. In the case where, for example, ammonia is used as a nitrogen compound, reactions like the following occur, thus forming amine radicals in the high-temperature zone.
(1) During the combustion of the hydrocarbon compound, hydroxy radicals (OH*) are formed.
(2) The hydroxy radicals act on the ammonia, thus forming amine radicals ($NH_2$*) according to the following formula:

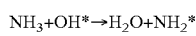

In the present invention, since a nitrogen compound and a hydrocarbon compound are added to the high-temperature zone, amine radicals are efficiently formed by the reaction of the nitrogen compound and the hydroxy radicals formed from the hydrocarbon compound, and little unreacted nitrogen compound remains in the reducing gas.

The high-temperature zone is preferably 600° C. to 1000° C., and more preferably 700° C. to 1000° C., and even more preferably 800° C. to 900° C. By bringing the temperature of the high-temperature zone to within the above ranges, the decomposition of the hydrocarbon compound into hydroxy radicals and the decomposition of the nitrogen compound into amine radicals proceeds efficiently and stably.

In addition, an electric heater or similar means may be used instead of a burner to form the high-temperature zone. Furthermore, the nitrogen compound and the hydrocarbon compound may be separately heated by a different heating means such as an electric heater or similar means, and then injected each separately into the pipe portion 5. In this case, the flow zone of collision and merging of the injected nitrogen compound and hydrocarbon compound performs a role identical to the high-temperature zone 22 and forms the hydroxy radicals and the amine radicals.

In the present invention, the location where the high-temperature zone 22 is formed is not particularly limited, and the high-temperature zone 22 may be formed in a pipe portion 5 communicated with the flue 10, as shown in FIG. 2, or alternatively, the high-temperature zone 22 may be formed in the interior of the flue 10. If the high-temperature zone 22 is formed in the pipe portion 5, amine radicals can be stably formed without effects such as fluctuation in the exhaust gas flow speed. In addition, if the high-temperature zone 22 is formed in the interior of the flue 10, the formed amine radicals immediately act on the nitrogen oxides, and in addition the denitration efficiency can be improved since the temperature of the exhaust gas flowing through the flue 10 is increased.

If the high-temperature zone 22 is formed in the pipe portion 5, it is preferable to set the distance from the surface of the wall of the flue 10 to the high-temperature zone 22 to a degree such that the formed amine radicals do not vanish by the time they reach the flue 10. Specifically, it is favorable to set the point of intersection of the center line of nitrogen compound nozzle 8 and the center line of the pipe portion 5 in the high-temperature zone 22 to be approximately 0 cm to 15 cm from the surface of the wall of the flue 10.

In the embodiment in FIG. 2, the burner 20 forms the flame 21 by combusting a supplied fuel gas (f) and air (d). In addition, in order to promote the combustion of the hydrocarbon compound (b) and the flame 21, air (d) may be introduced from the periphery of the burner 20 as necessary.

In addition, it is preferable to separately blow the nitrogen compound (a) and the hydrocarbon compound (b) toward the high-temperature zone 22 formed at the lower end tip of the flame 21 of the burner 20. This method allows for amine radicals to be formed more readily and excellent denitration effects to be obtained compared to the case wherein the nitrogen compound (a) and the hydrocarbon compound (b) are mixed and then injected into the flame 21, or the case wherein these compounds are supplied and combusted with the fuel gas (f).

It is preferably to dispose the nozzle 8, which injects the nitrogen compound, and the nozzle 9, which injects the hydrocarbon compound, such that the nozzles protrude from the inner wall surface of the pipe portion 5. In addition, it is preferable to provide the nozzle 8 and the nozzle 9 in opposing locations to each other with the high-temperature zone 22 provided therebetween, and additionally such that the nozzles blow at set angles in the direction of the flue 10. In the example in FIG. 2, the injection angle of the nozzle 8 and the injection angle of the nozzle 9 are made to be equal, but the nozzles need not be provided at identical angles. For example, in order to give precedence to the formation of the hydroxy radicals, the nozzle 9 for the hydrocarbon compound may be provided at an increased injection angle facing the upstream side of the high-temperature zone. The disposing locations and injection angles of the nozzle 8 and the nozzle 9 may be adjusted according to their distance to the flame 21 of the burner 20 such that amine radicals are efficiently formed and the obtained reducing gas is easily delivered to the interior of the flue 10.

The nitrogen compound (a) is not particularly limited so long as amine radicals can be formed therefrom, and ammonia, urea, cyanuric acid, amines, nitrites, etc., may be used. It is particularly preferable to use at least one selected from the group consisting of ammonia, urea, cyanuric acid, and aliphatic amines.

In addition, substances such as aliphatic hydrocarbons with carbon numbers from 1 to 16, light oil, heavy fuel oil, or gasoline may be used for the hydrocarbon compound (b). It is particularly preferable to use at least one selected from the group consisting of aliphatic hydrocarbons with carbon numbers from 1 to 12, light oil and heavy fuel oil. Examples of aliphatic hydrocarbons with carbon numbers from 1 to 16 include methane, propane, butane, hexane, octane, and dodecane. Among these, hexane, octane, and dodecane are preferable.

In the present invention, the denitration step is the step wherein the reducing gas containing amine radicals that was formed in the radical formation step 3 is mixed with the pretreated gas (p) containing nitrogen dioxide that was discharged from the preliminary step, and thereby the nitrogen oxides therein are reductively decomposed and removed. Since the nitrogen oxides in the pretreated gas (p) include nitrogen dioxide, the reactivity thereof is increased compared to the case of nitrogen monoxide only. Also, since the reducing gas consists of highly reactive amine radicals, the reductive decomposition of nitrogen oxides can be efficiently conducted, even when the temperature of the treated gas is low. At the same time, since a reduction catalyst is not used, the denitration efficiency is not lowered due to the formation of compounds such as ammonium sulfate, even when the gas contains sulfur oxides.

Figure 3:
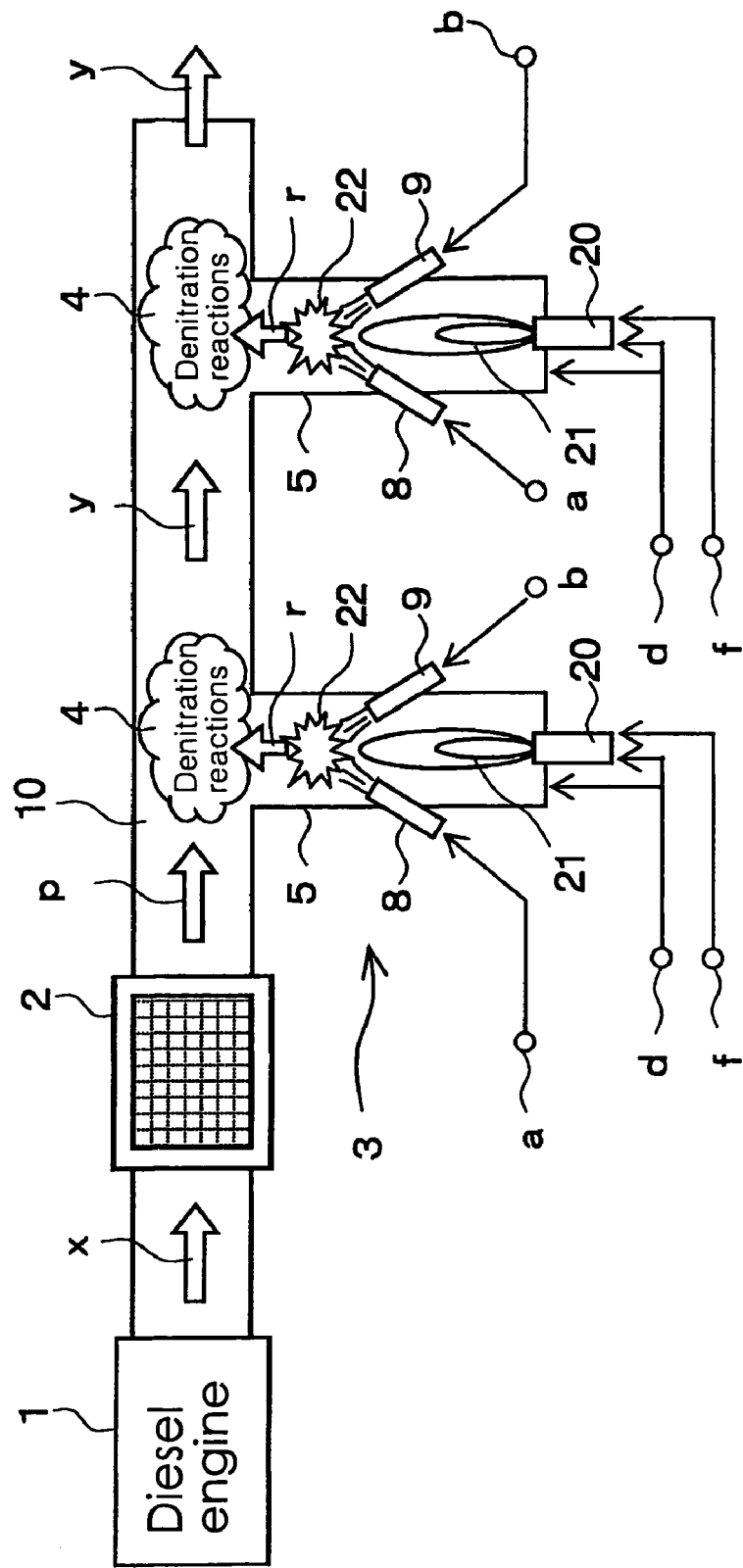
FIG. 3 is an explanatory diagram showing a further exemplary equipment configuration used in the exhaust gas denitration process of the present invention.

FIG. 3 is an explanatory diagram showing another embodiment of the exhaust gas denitration process of the present invention, wherein a further denitration step has been added in series to the denitration process shown in FIG. 2. In other words, FIG. 3 shows a denitration process wherein the treated gas discharged from the first denitration step is further subjected to the action of amine radicals.

In FIG. 3, the process from the first denitration step 4 to the discharging of the treated gas (y) is identical to that of the denitration process described above. The second denitration process adds a radical formation step 3 and a denitration step 4 in identical ways in the configuration of the first process. For this reason, these processes are indicated using shared reference numbers. In the example shown in the figure, amine radicals (r) act on the treated gas (y) once, but may also act on two or more times. In such a case, since the reactivity of the amine radicals is high, it is possible to efficiently conduct removal of nitrogen oxides in the treated gas (y), even if the temperature of the treated gas (y) is low or the concentration of nitrogen oxides is low.

In this embodiment, it is possible to significantly raise the ultimate denitration rate, since the nitrogen oxides remaining in the treated gas (y) are processed for removal. For example, if the denitration rate for the first denitration process is 40%, then 60% of the original amount nitrogen oxides remains in the treated gas having finished the first denitration process. However, by further subjecting the treated gas to the action of amine radicals, the amount of nitrogen oxides remaining in the treated gas becomes 36%. Furthermore, if the gas is again subjected to the action of amine radicals, the amount nitrogen oxides remaining in the treated gas becomes 22%. Consequently, while the denitration rate is 40% when the denitration process is conducted once, the denitration rate is 64% when conducted twice, and 78% when conducted three times. Thus, a high denitration rate of 60% or greater can be obtained.

In addition, under low-temperature conditions wherein the exhaust gas temperature is 200° C. to 300° C., the denitration rate for a one-time denitration process wherein nitrogen oxides are reacted with amine radicals is 35% to 55%. However, even in the case of a denitration rate of 35%, the cumulative denitration rate for gas subjected to the action of amine radicals twice is 58%, and 73% when subjected three times. Moreover, in the case of a denitration rate of 55%, the cumulative denitration rate for gas subjected to the action of amine radicals twice is 80%, and 91% when subjected three times. Thus, in either case an exceedingly high denitration rate is obtainable.

Since the denitration process of the present invention forms amine radicals in the high-temperature zone that act directly on the nitrogen oxides in the exhaust gas, the denitration process is little affected by the temperature of the exhaust gas and the concentration of nitrogen oxides. For this reason, even in the case where amine radicals are further made to act on a treated gas that has completed the denitration process once, the denitration efficiency per process cycle is not lowered, and the denitration reactions can be cumulatively promoted. Consequently, by providing a plurality of denitration steps like that above and processing exhaust gas in multiple stages, the ultimate denitration rate can be furthered increased. In addition, since a reduction catalyst is not used and the amount of residual nitrogen oxides is low, catalyst poisoning and byproducts such as ammonium sulfate do not occur, even in the case where the exhaust gas includes sulfur oxides. Thus, the denitration efficiency is not lowered, even when performing plural repetitions of the denitration process.

For a single cycle of the denitration process, wherein amine radicals act on an exhaust gas (x) or a treated gas (y), it is preferable that the supplied amount of amine radicals per unit time with respect to 1 mol of flow rate per unit time of the nitrogen oxides to be treated be 0.5 mol to 1.5 mol, and more preferably 0.7 mol to 1.3 mol. By bringing the amount of the nitrogen oxides and amine radicals in the exhaust gas and the treated gas to within the above ranges, the reaction efficiency of the denitration process can be increased, while in addition lowering treatment costs. The supplied amount of amine radicals can be adjusted by changing the flow volume of the nitrogen compound and the hydrocarbon compound added to the high-temperature zone.

In addition, it is favorable that the interval when disposing a plurality of denitration steps in series be configured such that a downstream denitration step is disposed in a location where the flow of exhaust gas that was disturbed by the upstream denitration step is again rectified. For example, the ratio L/D of the adjacent denitration step interval L versus the inner diameter D of the flue 10 is preferably 2 to 20, and more preferably 5 to 10. By bringing the interval between adjacent denitration steps within the above range, the efficiency of the downstream denitration treatment can be increased.

Furthermore, the direction in which the pipe portion of the radical formation step couples to the flue may be made to mutually differ for adjacent denitration steps. For example, the coupling directions with respect to the flue may be disposed split among left and right or vertical and horizontal. In so doing, regions that were not reached by the amine radicals in the first denitration process are subject to the action of amine radicals from a different direction during the second denitration treatment, and thus the exhaust gas flowing in the flue is uniformly subject to the denitration treatment.

Figure 4:
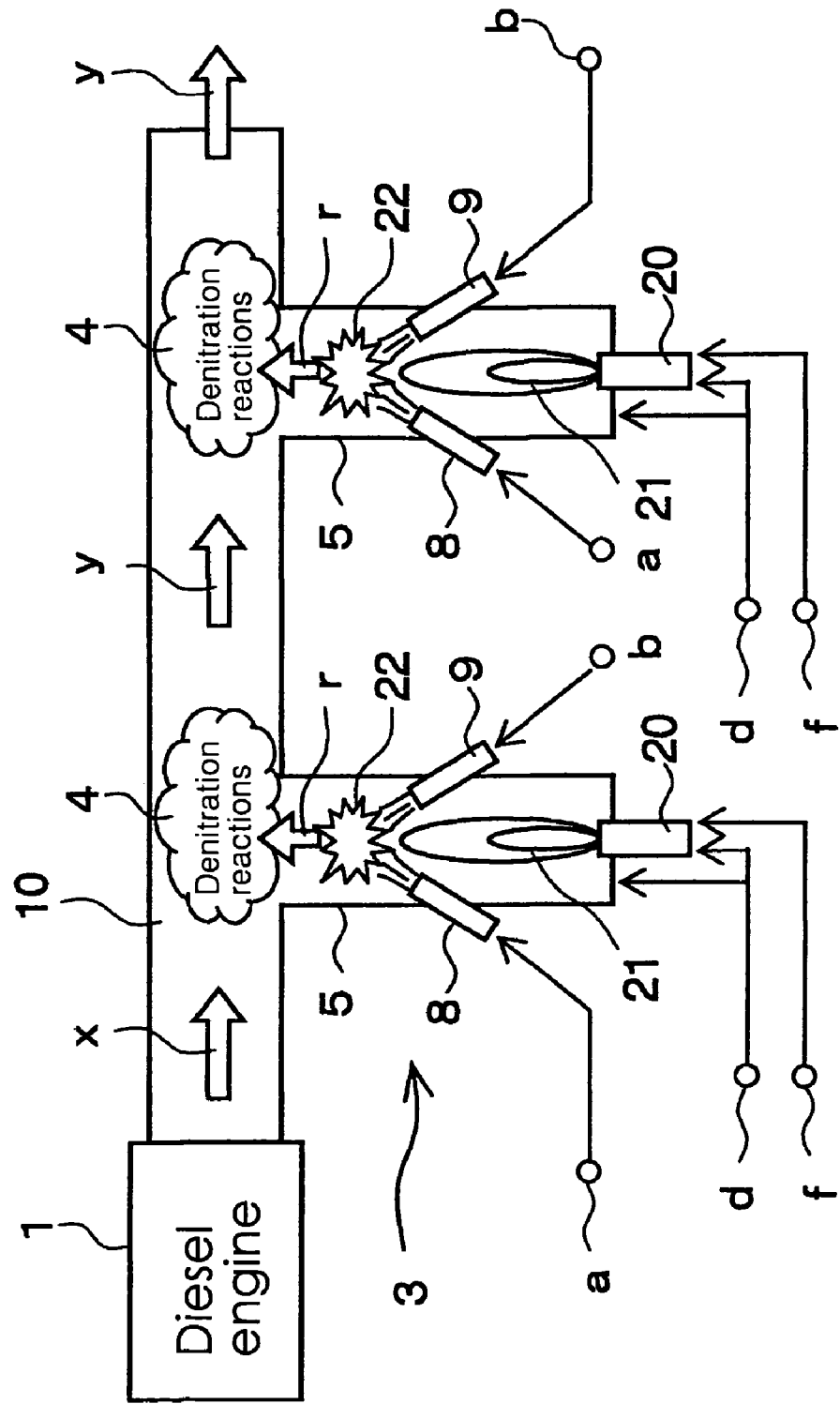
FIG. 4 is an explanatory diagram showing a still further exemplary equipment configuration used in the exhaust gas denitration process of the present invention.

FIG. 4 is an explanatory diagram showing a further embodiment of the exhaust gas denitration process, being an example of the denitration process shown in FIG. 3 but wherein the preliminary step is eliminated. In this embodiment, the exhaust gas is not oxidized, and a plurality of denitration treatments are performed on the gas as-is.

In FIG. 4, a burner 20 is provided in a pipe portion 5 communicated with an exhaust gas flue 10 at an approximate right angle. A nitrogen compound (a) and a hydrocarbon compound (b) are added from nozzles 8 and 9 toward a high-temperature zone 22 formed at the tip of a flame 21 of the burner 20. amine radicals (r) are formed in this high-temperature zone 22 and subsequently supplied to and mixed in the flue 10, whereby nitrogen oxides in an exhaust gas (x) are reduced by denitration reactions, thereby obtaining a treated gas (y). This treated gas (y) is then further subject to amine radicals (r), which are formed, supplied, and mixed therewith in a manner similar to the above, and thereby residual nitrogen oxides in the treated gas (y) are reductively decomposed. Although FIG. 4 illustrates an example wherein denitration reactions are repeated twice, the denitration process may be further repeated to subject this treated gas (y) to the action of the amine radicals (r). In this way, by providing a plurality of denitration steps to perform denitration treatment, nitrogen oxides in the exhaust gas can be reductively decomposed and removed with a high denitration efficiency, even in the case where a preliminary step is not provided.

In the present invention, the gas subjected to treatment is not particularly limited, and may for example include exhaust gas from a diesel engine on a ship or power generator, exhaust gas from an automotive diesel engine, boiler exhaust gas, or plant off-gas. Typically, exhaust gas from diesel engines contains harmful substances such as particulate matter, nitrogen oxides, and sulfur oxides. In many cases, particulate matter is present primarily as soot, nitrogen oxides are present primarily as nitrogen monoxide, and sulfur oxides are present primarily as sulfur dioxide. The concentration of sulfur oxides in the exhaust gas (x) is preferably 50 ppm or greater, more preferably 100 ppm or greater, and preferably 500 ppm or greater in particular. In this concentration range, the effectiveness of the invention becomes more pronounced.

Moreover, as the temperature of the exhaust gases from diesel engines on ships and power generators are comparatively low, conventionally they have been difficult to apply non-catalytic denitration processes to the gases as-is. However, the denitration process of the present invention, an object thereof being to raise the denitration efficiency of such exhaust gas, is able to treat such exhaust gas as-is without heating or warming treatments. Not only that, denitration can be performed with a high efficiency. The temperature of the exhaust gas is preferably 200° C. to 450° C., more preferably 250° C. to 450° C., and preferably 250° C. to 300° C. in particular. Even at such low temperatures, sufficient denitration effects are obtainable.

The diesel engine fuel is not particularly limited, and light oil, Class A heavy fuel oil, Class C heavy fuel oil, DME or similar oil may be used. Among these, it is preferable to use a fuel that contains a sulfur component in order to make use of the characteristics of the denitration process of the invention, and thus Class A heavy fuel oil and Class C heavy fuel oil are preferable. Class A heavy fuel oil is stipulated by JIS standard (JIS K2205) as having a sulfur content of not more than 0.5 mass % for Category 1 No. 1 fuel, and not more than 2.0 mass % for Category 1 No. 2 fuel, while Class C heavy fuel oil is stipulated as having a sulfur content of not more than 3.5 mass % for Category 3 No. 1 fuel. Among these, the Class A heavy fuel oil used in diesel engines such as those on ships and diesel power generators primarily has a sulfur content of not more than 0.2 mass %, while the Class C heavy fuel oil primarily has a sulfur content of not more than 3.5 mass %.

Hereinafter, the present invention will be described in further detail by describing embodiments thereof. However, it should be appreciated that the scope of the invention is not to be limited to these embodiments.

EMBODIMENTS

Figure 5:
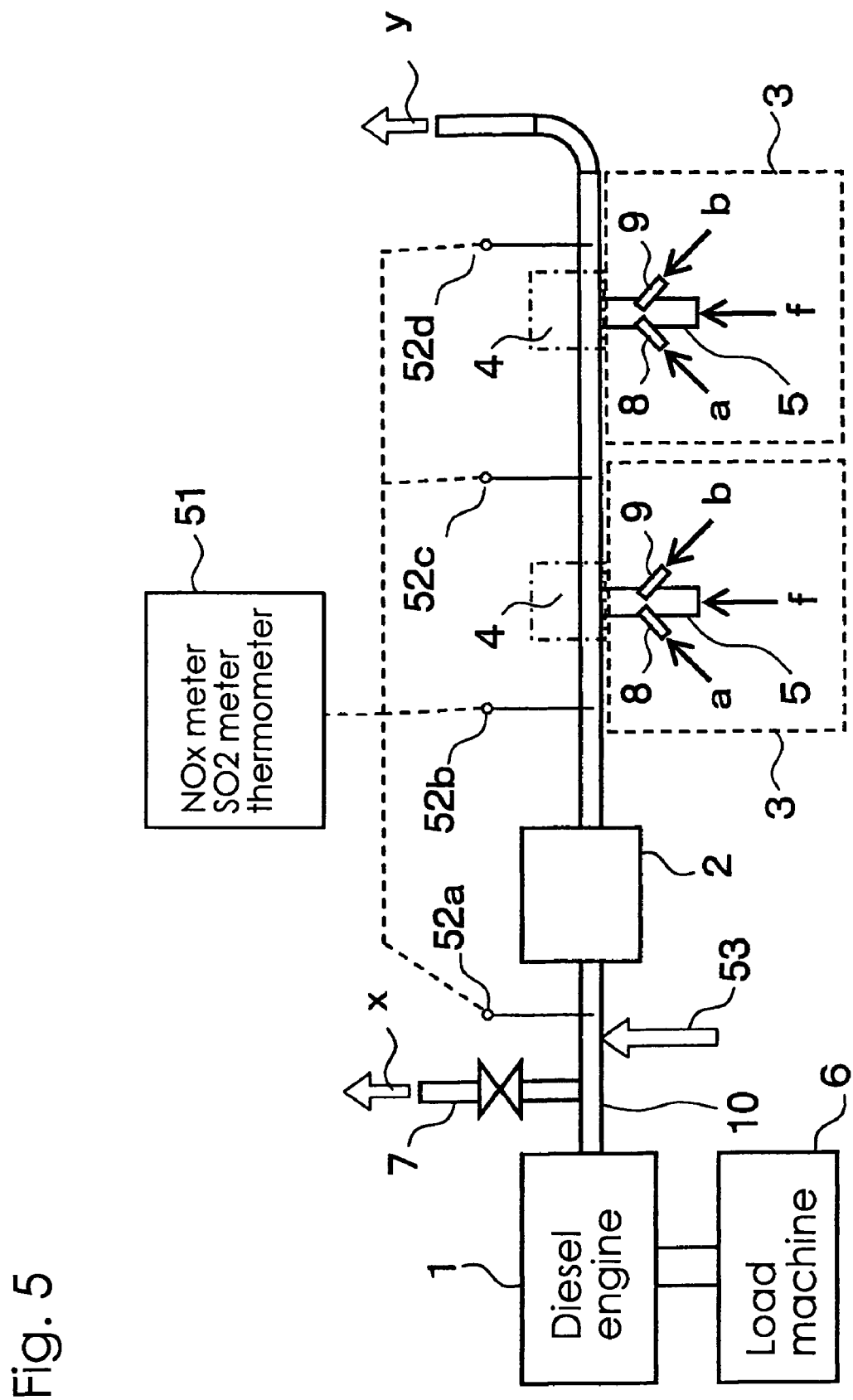
FIG. 5 is an explanatory diagram showing a schematic of the test equipment used in an embodiment of the invention.

Using the test equipment shown in FIG. 5, exhaust gas was treated for denitration, and the concentration of nitrogen oxides as well as the concentration of sulfur oxides were measured for each step.

In FIG. 5, exhaust gas from a diesel engine 1 is drawn into a flue 10 and a bypass line 7, wherein the preliminary step 2 and denitration steps 4 are disposed in the flue 10, and radical formation steps 3 are disposed to communicate to the denitration steps 4. The high-temperature zones of the radical formation steps 3 are formed at the downstream tips of burner flames. The sizes of the piping used and the gas flow rate in the pipes were those shown in Table 1.

TABLE 1

| | Piping inner diameter (mm) | Gas flow rate (mN/s) |
|---|---|---|
| Flue 10 | 150 | 1 |
| Pipe portion 5 | 100 | 3 |
| Nitrogen compound nozzle 8 | 4 | 8 |
| Hydrocarbon compound 9 | 4 | 8 |

In addition, a measuring point 52*a* is provided upstream to the preliminary step 2, a measuring point 52*b* is provided between the preliminary step 2 and the first denitration step 4, a measuring point 52*c* is provided between the first and the second denitration steps 4, and a measuring point 52*d* is provided downstream to the second denitration step 4. Each measuring point is coupled to a $NO_x$ meter, a $SO_2$ meter, and a thermometer 51, which measure the concentration of nitrogen oxides, the concentration of sulfur dioxide, and the gas temperature at each measuring point. Furthermore, an $SO_2$ injector 53 is provided upstream to the measuring point 52*a* such that the amount of $SO_2$ in the exhaust gas can be adjusted to a set concentration.

Embodiment 1

The angles formed by the center lines of the nozzle 8 and the nozzle 9 of the radical formation step 3 with the center line of the pipe portion 5 were both set to 45 degrees, and the points of intersection of the center lines of the nozzle 8 and the nozzle 9 with the center line of the pipe portion 5 were both set up so as to be positioned at a distance of 10 cm from the inner wall surface of the flue 10. In addition, the position of the burner and the strength of the flame were adjusted so as to bring the temperature of the area near the above intersection points to be 800° C. to 900° C.

A pulsed plasma generator was used as the means for the oxidation process of the preliminary step, and the denitration process was conducted so as not to activate the second denitration step. Furthermore, the exhaust gas temperature was made to be 300° C. at the measuring point 52*a*. Ammonia was used for the nitrogen compound blown from the nozzle 8, and propane gas was used for the hydrocarbon compound blown from the nozzle 9.

$NO_x$ concentrations and $SO_2$ concentrations were measured during the denitration treatment process at the measuring points 52*a*, 52*b*, and 52*c*. The obtained results are shown in Table 2. The oxidation rate Nc of nitrogen monoxide at the measuring point 52*b* was 51%, and the ratio Sc/Nc of the sulfur dioxide oxidation rate to Nc was 0.04.

TABLE 2

| Measuring point | | Embodiment 1 | Comp. Ex. 1 | Comp. Ex. 2 |
|---|---|---|---|---|
| $NO_x$ concentration (ppm) | 52a | 860 | 860 | 860 |
| | 52b | 860 | 860 | 860 |
| | 52c | 240 | 490 | 830 |
| $SO_2$ concentration (ppm) | 52a | 540 | 540 | 540 |
| | 52b | 520 | 540 | 520 |
| | 52c | 510 | 540 | 510 |
| Denitration rate | | — | 72% | 43% | 3% |

Comparative Example 1

Denitration treatment identical to that of embodiment 1 was conducted, except that the plasma generator in embodiment 1 was switched off and the exhaust gas oxidation treatment was not conducted. The obtained results are shown in Table 2. The oxidation rate Nc of nitrogen monoxide at the measuring point 52*b* was 6%, and the ratio Sc/Nc of the sulfur dioxide oxidation rate to Nc was 0.

Comparative Example 2

Denitration treatment identical to that of embodiment 1 was conducted, except that nitrogen gas was blown from the nozzle 9 instead of propane gas in embodiment 1. The obtained results are shown in Table 2. The oxidation rate Nc of nitrogen monoxide at the measuring point 52*b* was 51%, and the ratio Sc/Nc of the sulfur dioxide oxidation rate to Nc was 0.04.

As is apparent from the results in Table 2, embodiment 1 achieved excellent results with a denitration rate of approximately 72%, despite the fact that the exhaust gas temperature was at a low 300° C. In contrast, comparative example 1, wherein the exhaust gas was non-catalytically treated without undergoing oxidation treatment, had a low denitration rate of approximately 43%. Comparative example 2, wherein nitrogen gas was added instead of propane gas, had an extremely low denitration rate of approximately 3%.

Embodiment 2

The angles formed by the center lines of the nozzle 8 and the nozzle 9 of the radical formation step 3 with the center line of the pipe portion 5 were both set to 45 degrees, and the points of intersection of the center lines of the nozzle 8 and the nozzle 9 with the center line of the pipe portion 5 were both modified in the setup so as to be positioned at a distance of 5 cm from the inner wall surface of the flue 10. In addition, the position of the burner and the strength of the flame were adjusted so as to bring the temperature of the area near the above intersection points to be 800° C. to 900° C.

The exhaust gas temperature at the measuring point 52a was made to be 250° C., $NO_x$ concentration and $SO_2$ concentration was modified to the values shown in Table 3, and denitration treatment was conducted using a pulsed plasma generator in the preliminary step followed by a first and a second denitration step. Ammonia was used for the nitrogen compound blown from the nozzle 8 in the radical formation steps, being adjusted such that the concentration of ammonia added by the first nozzle 8 was 620 ppm, and the concentration of ammonia added by the second nozzle 8 was 280 ppm. Propane gas was used for the hydrocarbon compound blown from the nozzle 9, being adjusted such that the added amounts were appropriate to the first and second added amounts of ammonia.

$NO_x$ concentrations and $SO_2$ concentrations were measured during the denitration treatment process at the measuring points 52a, 52b, 52c, and 52d. The obtained results are shown in Table 3. The oxidation rate Nc of nitrogen monoxide at the measuring point 52b was 51%, and the ratio Sc/Nc of the sulfur dioxide oxidation rate to Nc was 0.04.

TABLE 3

| Measuring point | 52a | 52b | 52c | 52d |
|---|---|---|---|---|
| $SO_2$ concentration (ppm) | 260 | 240 | 255 | 255 |
| $NO_x$ concentration (ppm) | 620 | 620 | 280 | 155 |
| Denitration rate | — | — | 55% | 45% |

From the results in Table 3, the denitration rates for the first-stage and second-stage denitration reactions were respectively 55% and 45%, yielding a final denitration rate of 75%. With the present embodiment, it was found that the denitration rate of the first-stage denitration reactions after performing oxidation treatment on the exhaust gas is high compared to that of embodiment 1, and the denitration rate of the second-stage denitration reactions hardly decreases, even though the amount of residual nitrogen oxides is low.

Reference Example

Denitration treatment identical to that of embodiment 2 was conducted, except for the following: the pulsed plasma generator was switched off and oxidation treatment on the exhaust gas was not conducted; the amount of ammonia was adjusted such that the concentration of ammonia added by the first nozzle 8 was 620 ppm, and the concentration of ammonia added by the second nozzle 8 was 350 ppm; and the amount of propane gas was adjusted such that the added amounts were appropriate to the first and second added amounts of ammonia. The obtained results are shown in Table 4.

TABLE 4

| Measuring point | 52a | 52b | 52c | 52d |
|---|---|---|---|---|
| $SO_2$ concentration (ppm) | 260 | 240 | 255 | 255 |
| $NO_x$ concentration (ppm) | 620 | 620 | 355 | 210 |
| Denitration rate | — | — | 43% | 41% |

From the results in Table 4, the denitration rates for the first-stage and second-stage denitration reactions were 43% and 41%, yielding a final denitration rate of 66%. With the present reference example, it was found that the denitration rates of the first-stage and second-stage denitration reactions hardly decrease, and a high final denitration rate of 66% was achieved.

The invention claimed is:

1. An exhaust gas denitration process for reductively removing nitrogen oxides contained in exhaust gas having a temperature of 200° C. to 450° C. and containing nitrogen monoxide and sulfur dioxide, comprising the steps of:
   as a preliminary step, pretreating said exhaust gas by partially oxidizing nitrogen monoxide contained therein to form nitrogen dioxide;
   as a radical formation step, forming an independent high temperature zone to which a nitrogen compound and a hydrocarbon compound are added to form an amine radical; and
   as a denitration step, conducting a denitration treatment by mixing the amine radical from the radical formation step and the pretreated gas containing nitrogen monoxide and nitrogen dioxide discharged from the preliminary step to form a treated gas, said steps being carried out in the absence of a reduction catalyst.

2. The exhaust gas denitration process according to claim 1, further comprising the step of;
   mixing additional amine radicals with the treated gas discharged from the denitration step.

3. The exhaust gas denitration process according to claim 2, further comprising
   two or more times of the mixing step wherein amine radicals are mixed with the treated gas.

4. The exhaust gas denitration process according to claim 1, wherein the high-temperature zone is formed in the vicinity of a burner flame or an electric heater.

5. The exhaust gas denitration process according to claim 1, wherein the high-temperature zone is 600° C. to 1000° C.

6. The exhaust gas denitration process according to claim 1, wherein the high-temperature zone is formed in the interior of a flue for the exhaust gas.

7. The exhaust gas denitration process according to claim 1, wherein nitrogen monoxide is oxidized to nitrogen dioxide by subjecting the exhaust gas to contact treatment with an oxidation catalyst or plasma exposure treatment in the preliminary step.

8. The exhaust gas denitration process according to claim 7, wherein the oxidation catalyst supports an active metal on a titanium-containing carrier, and the active metal is at least one selected from the group consisting of a vanadium compound, a niobium compound, a molybdenum compound, and a tungsten compound.

9. The exhaust gas denitration process according to claim 1, wherein a ratio Sc/Nc of the sulfur dioxide oxidation rate Sc to the nitrogen monoxide oxidation rate Nc is 0.01 to 0.2 in the preliminary step.

* * * * *